US007054152B2

(12) United States Patent
Francke et al.

(10) Patent No.: US 7,054,152 B2
(45) Date of Patent: May 30, 2006

(54) NOTEBOOK COMPUTER WITH HIDDEN MULTIMEDIA CONTROLLER

(75) Inventors: Justin Francke, Taipei Hsien (TW); Chao-Ming Chu, Taipei Hsien (TW); Keng-Hung Liu, Taipei Hsien (TW); Shyh-Ching Lin, Taipei Hsien (TW); Ho-Ching Huang, Taipei Hsien (TW); Kai-Chen Tien, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 198 days.

(21) Appl. No.: 10/672,670

(22) Filed: Sep. 26, 2003

(65) Prior Publication Data

US 2004/0096053 A1    May 20, 2004

(30) Foreign Application Priority Data

Nov. 19, 2002    (TW) .............................. 91218590 U

(51) Int. Cl.
*G06F 1/16*    (2006.01)
(52) U.S. Cl. ..................................... 361/685; 361/683

(58) Field of Classification Search ........ 361/680–681, 361/683, 686, 724–725
See application file for complete search history.

(56) References Cited

U.S. PATENT DOCUMENTS

| 4,951,241 | A * | 8/1990 | Hosoi et al. ................. 361/680 |
| 5,825,614 | A * | 10/1998 | Kim ............................ 361/683 |
| 6,229,694 | B1 * | 5/2001 | Kono ........................... 361/683 |
| 6,231,371 | B1 * | 5/2001 | Helot .......................... 439/374 |
| 6,341,060 | B1 * | 1/2002 | Chuang ....................... 361/685 |

* cited by examiner

*Primary Examiner*—Yean-Hsi Chang
(74) *Attorney, Agent, or Firm*—Ladas & Parry LLP

(57) ABSTRACT

A notebook computer with hidden multimedia controller. The notebook computer has a cavity and a multimedia device. A multimedia controller with a plurality of keys to control the multimedia device movably pivoted to the main body. The notebook computer has a switch with a rod. Two magnets are individually disposed on the rod and the multimedia controller. The multimedia controller is attracted, remaining in the cavity. When the switch is pressed, the multimedia controller is pushed out from the cavity by the repulsive magnetic force.

21 Claims, 6 Drawing Sheets

NOTEBOOK COMPUTER WITH HIDDEN MULTIMEDIA CONTROLLER

BACKGROUND OF THE INVENTION

1. Field of the Invention

The present invention relates to a notebook computer, and in particular to a notebook computer with hidden multimedia controller.

2. Description of the Related Art

Conventional notebook computers usually have additional function keys to rapidly operate the multimedia device or software thereof. FIG. 1A shows a conventional notebook computer with a multimedia controller. The notebook computer 100 has an LCD 110 pivoted to the main body 120. On the front side surface is a multimedia module including function keys 121 and a small LCD module 122, or LED module. Although this arrangement is convenient for users, it limits the operating angle and is not comfortable to use.

FIG. 1B shows another conventional notebook computer with multimedia controller. The notebook computer 200 has an LCD 210 pivoted to the main body 220. The main body 220 of the notebook computer 200 is longer than the LCD 210 and has a multimedia controller with function keys 221 and a small LCD module 222 on the top surface of the extended portion. This arrangement may not limit the operating angle; however, the profile of the notebook computer 200 is not smooth and attractive enough.

SUMMARY OF THE INVENTION

Accordingly, an object of the invention is to provide another arrangement of the multimedia device in a notebook computer, such that it is convenient to use and the notebook computer can have a better profile.

The present invention provides a notebook computer with a hidden multimedia controller. The notebook computer includes a cavity and a multimedia device, such as a disc driver or MP3 player. A multimedia controller has at least one key to control the multimedia device and is pivoted to the main body movable between a first position and a second position. The multimedia controller is received in the cavity when it is in the first position. The multimedia controller appears when it is in the second position.

According to the embodiment, the multimedia controller is pivoted to a side surface of the notebook computer.

Moreover, the notebook computer has a switch. When the switch is pressed, the multimedia controller is moved from the first position to the second position. The multimedia controller has a second magnet. The switch includes a rod portion with a first magnet at the tip thereof, by which the multimedia controller is attracted remaining in the first position in the cavity. When the switch is pressed, the rod potion is shifted by a predetermined distance. The multimedia controller is pushed out by the repulsive magnetic force between the first magnet and the second magnet.

The multimedia controller of the notebook computer has an LCD module to show operating statuses.

Moreover, the notebook computer includes a monitor pivoted to the main body and a handle connected to the main body at the side closed to the monitor. The handle is pivoted to the main body and movable between a first angle and a second angle. When the handle is fixed at the first angle, the handle protrudes downward from the main body, changing the inclined angle thereof.

The present invention also provides a notebook computer having with a hidden multimedia controller. The notebook computer has a multimedia device and a monitor, pivoted thereof. A multimedia controller has at least one key to control the multimedia device, such as a disc drive. It is connected to the notebook computer opposite to the monitor and movable between a first position and a second position.

According to the embodiment, the notebook computer has a cavity at the opposite side of the monitor. The multimedia controller is hidden in the cavity when the multimedia controller is in the first position, and appears when in the second position. The multimedia controller is pivoted to a side surface of the notebook computer.

Furthermore, the notebook computer has a switch. The multimedia controller has a second magnet. The switch includes a rod portion with a first magnet at the tip thereof, by which the multimedia controller is attracted, remaining in the first position in the cavity. When the switch is pressed, the rod potion is shifted by a predetermined distance. The multimedia controller is pushed out by the repulsive magnetic force between the first magnet and the second magnet from the first position to the second position.

The notebook computer has a handle pivoted thereof at the side closed to the monitor. It is movable between a first angle and a second angle. When the handle is fixed at the first angle, the handle protrudes downward, by which can change the inclined angle of the notebook computer.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1A:
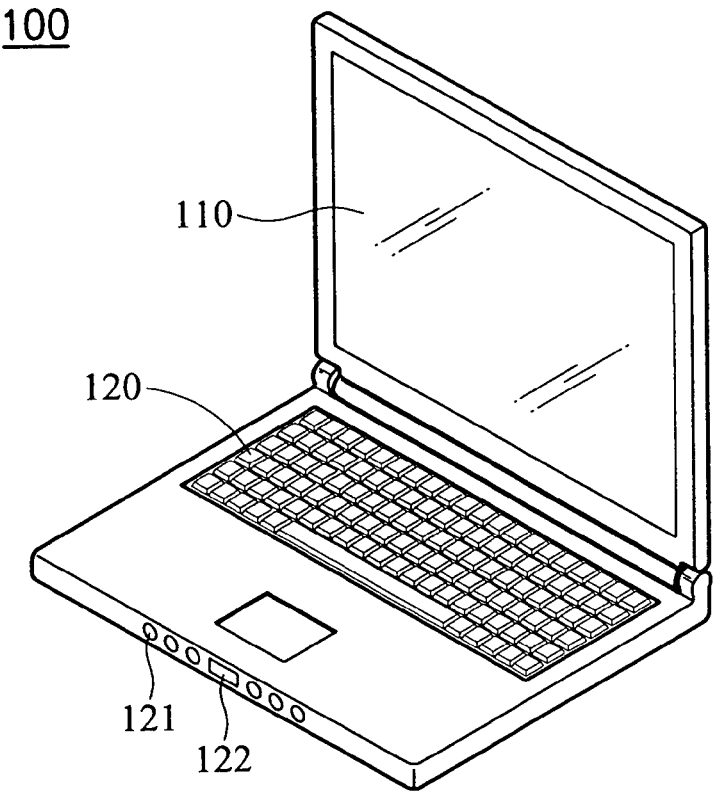
FIG. 1A is a schematic view of a conventional notebook computer with a multimedia controller.
Figure 1B:
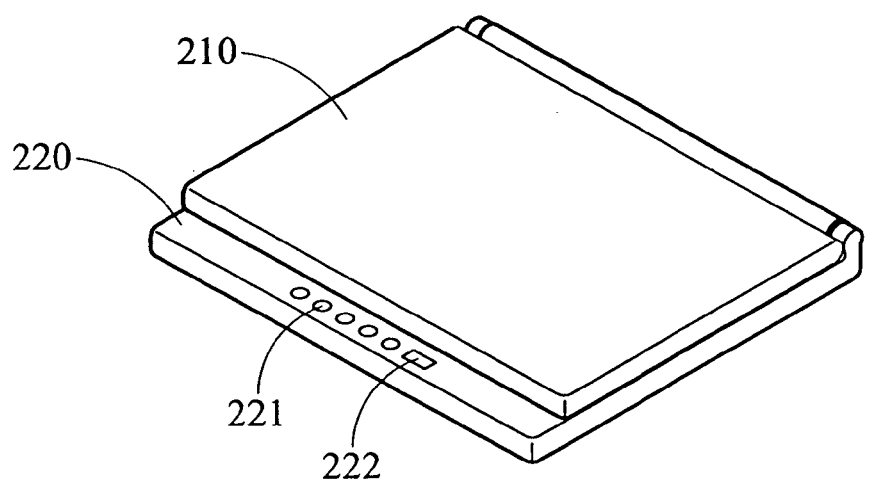
FIG. 1B is a schematic view of another conventional notebook computer with a multimedia controller.
Figure 2:
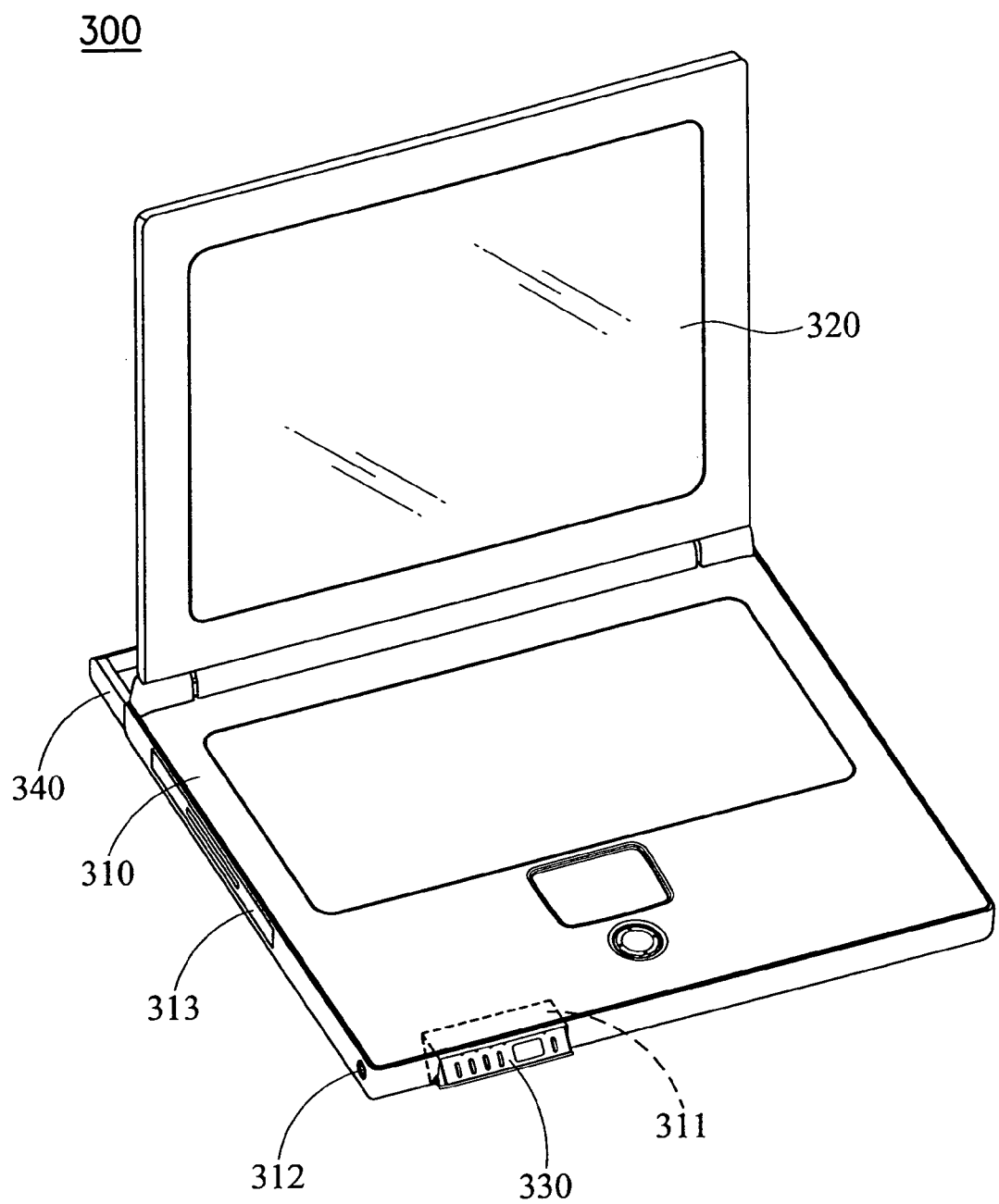
FIG. 2 is a schematic view of the notebook computer with a hidden multimedia controller of the invention.

FIG. 2 shows a notebook computer with a hidden multimedia controller of the invention. In FIG. 2, the notebook computer 300 includes an LCD 320 and handle 340 pivoted to the main body 310. The notebook computer 300 also has a multimedia device 313, such as a disc driver or MP3 player, and a multimedia controller 330.

The multimedia controller 330 in FIG. 2 has function keys 331 to control the multimedia device 313. The main body 310 of the notebook computer 300 has a cavity 311 on the front side surface. The multimedia controller 330 is pivoted to the main body 310 at the edge of the cavity 311, movable between a first position and a second position. When the multimedia controller 330 is in the first position and not being used, it is received, or hidden, in the cavity 311. Thus, the profile of the notebook computer 300 is smooth and artistic. In contrast, the multimedia controller 330 is shown in the second position when a switch 312 on the side surface of the main body 310 is pressed.

Accordingly, the present invention provides two embodiments of the hidden multimedia controller as follows:

First Embodiment

Figure 3A:
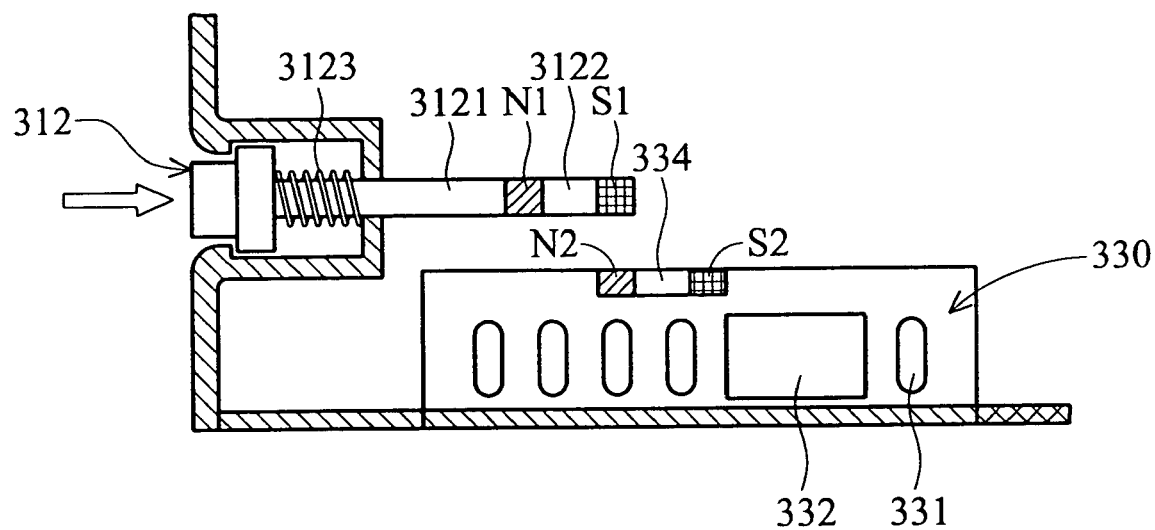
FIG. 3A is a cross section of the multimedia controller received in the cavity of the notebook computer in first embodiment.
Figure 3B:
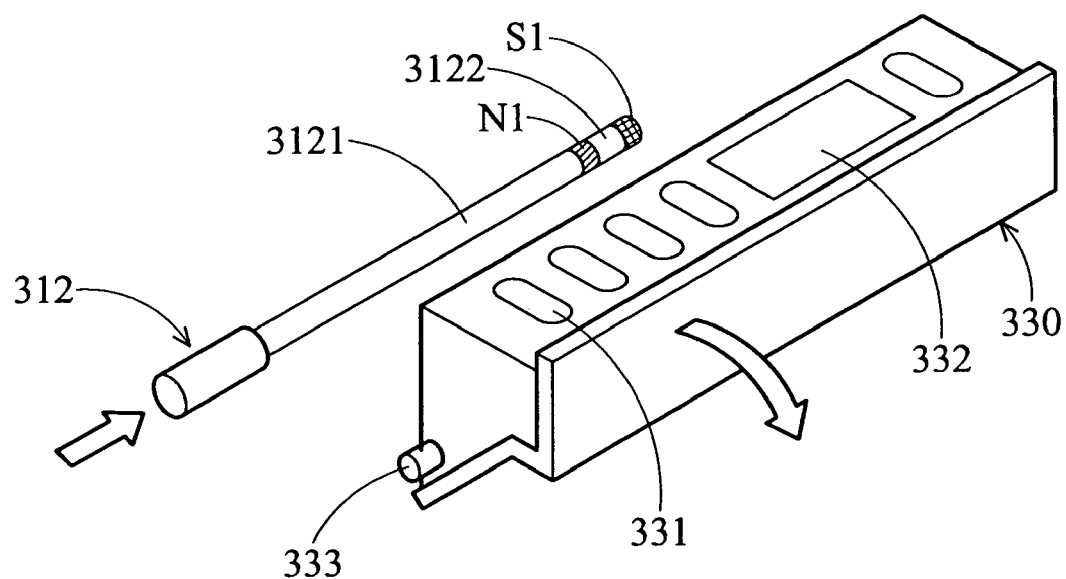
FIG. 3B is a schematic view of the multimedia controller and the switch in FIG. 3A.

FIGS. 3A and 3B show a multimedia controller of the invention in the first embodiment. In FIGS. 2, 3A and 3B, the multimedia controller 330 has at least one function key 331, small LCD module 332 (or LED module) and shaft 333. The multimedia controller 330 is pivoted to the shell of main body 310 by the shaft 333 and can be received in the cavity 311. The function keys 331 are electrically connected to the multimedia device 313 to control thereof. The LCD module 332 is to show operating statuses of the multimedia device 313.

In this embodiment, the multimedia controller 330 has a second magnet 334 with two magnetic poles N2, S2. The main body 310 of the notebook computer 300 has a switch 312. The switch 312 has a flange and a rod portion 3121 with a first magnet 3122 at the tip thereof (as shown in FIG. 3A). The magnetic poles of the first magnet 3122 are marked with N1 and S1. The switch 312 is pushed by a spring 3123 to provide a leftward elastic force, such that the switch 312 can return to the original position when it is not pressed.

In FIG. 3A, the first and second magnets 3122, 334 are approximately equal in size. The magnetic north N1, N2 of first and second magnets 3122, 334 are disposed at left side, and the magnetic south S1, S2 of them are disposed at right side. When the switch 312 is not pressed, the magnetic south S1 of the first magnet 3122 attracts the magnetic north N2 of the second magnet 334. Thus, the multimedia controller 330 is attracted by the magnetic force between the first and second magnets 3122, 334, remaining in the cavity 311 of the main body 310. In FIG. 3B, when the switch 312 is pressed, the rod potion 3121 is shifted by a predetermined distance. The multimedia controller 330 is pushed out by the repulsive magnetic force between the first magnet 3122 and the second magnet 334. The multimedia controller 330 appears at about 45° when it is in the second position. Furthermore, when the switch 312 returns to its original position and the multimedia controller 330 is pushed back to the cavity 311, the magnetic south S1 of the first magnet 3122 attracts the magnetic north N2 of the second magnet 334, securing the multimedia controller 330 in the cavity 311.

Second Embodiment

Figure 4:
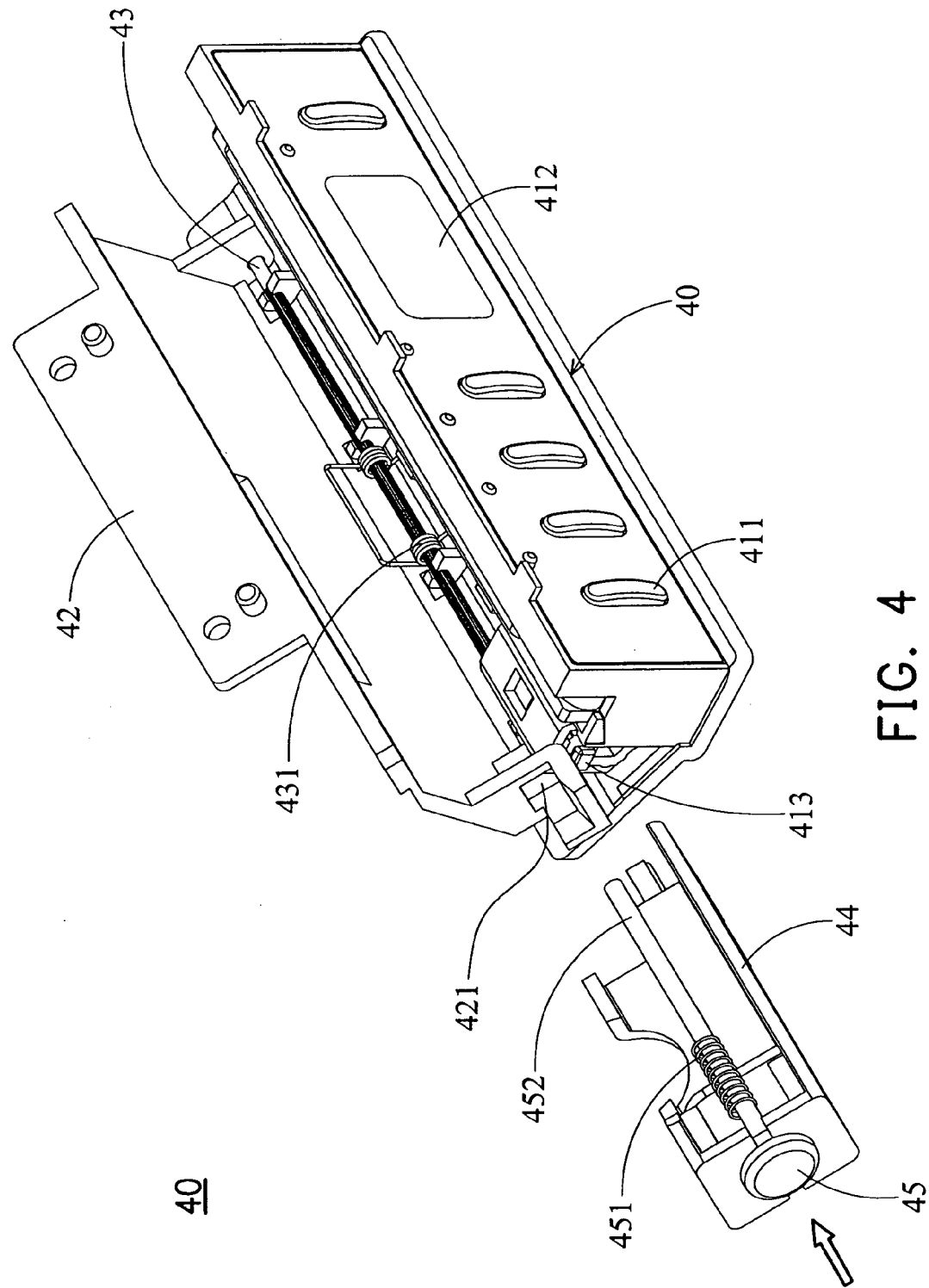
FIG. 4 is a perspective view of the multimedia controller of second embodiment.

FIG. 4 shows another multimedia controller of the invention. In FIG. 4, the multimedia controller 40 has function keys 411, a small LCD module 412 (or LED module) and a shaft 43. The multimedia controller 40 is pivoted to the shell of main body by the shaft 43 and can be received in the cavity. The function keys 411 are electrically connected to the multimedia device to control thereof. The LCD module 412 is to show operating statuses of the multimedia device.

In this embodiment, a shell member 42 can be assembled to the main body of the notebook computer. The multimedia controller 40 is pivoted to the shell member 42 by the shaft 43. A spring 431 disposed on the shaft 43, providing an elastic force to push out the multimedia controller 40. The shell member 42 has a through hole 421, and the multimedia controller 40 has a latch bolt 413 behind the function keys 411. When the multimedia controller 40 is received in the cavity, the latch bolt 413 is locked in the through hole 421, securing the multimedia controller 40.

In FIG. 4, a switch 45 is used to push out the multimedia controller 40. The switch 45 is assembled on a seat 44. The switch 45 has a flange and a rod portion 452. The rod portion 452 is aligned to the through hole 421. A spring 451 provides a leftward elastic force to keep the switch 45 returning to the original position. When the switch 45 is pressed, the tip of the rod potion 452 pushes the latch bolt 413. Thus, the multimedia controller 40 is sprung out by the elastic force, appearing at about 45°. When the switch 45 returns to its original position and the multimedia controller 40 is pushed back to the cavity, the latch bolt 413 is locked in the through hole 421, securing the multimedia controller 40 in the cavity.

Figure 5A:
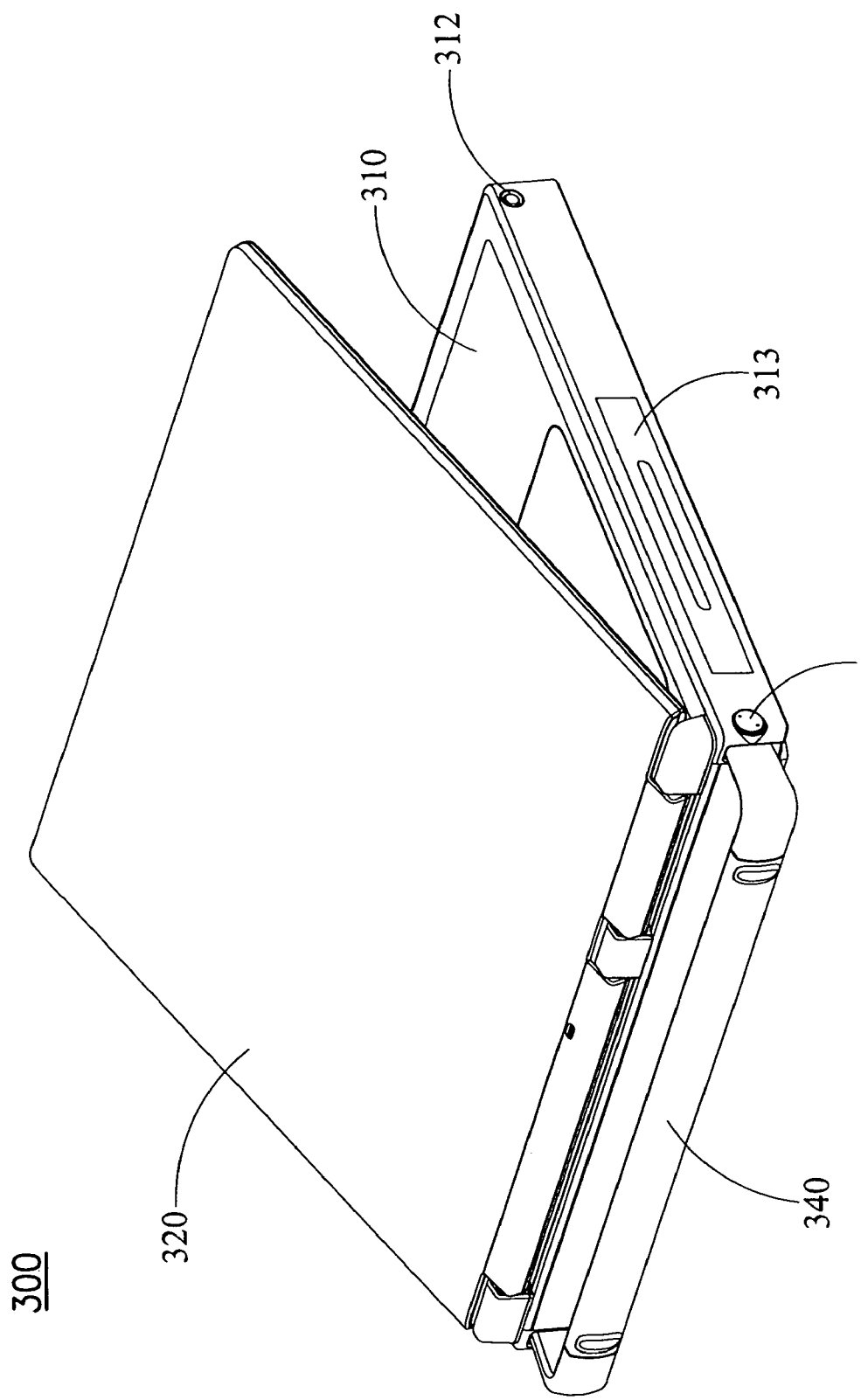
FIG. 5A is a back view of the notebook computer with a handle fixed in a normal position.
Figure 5B:
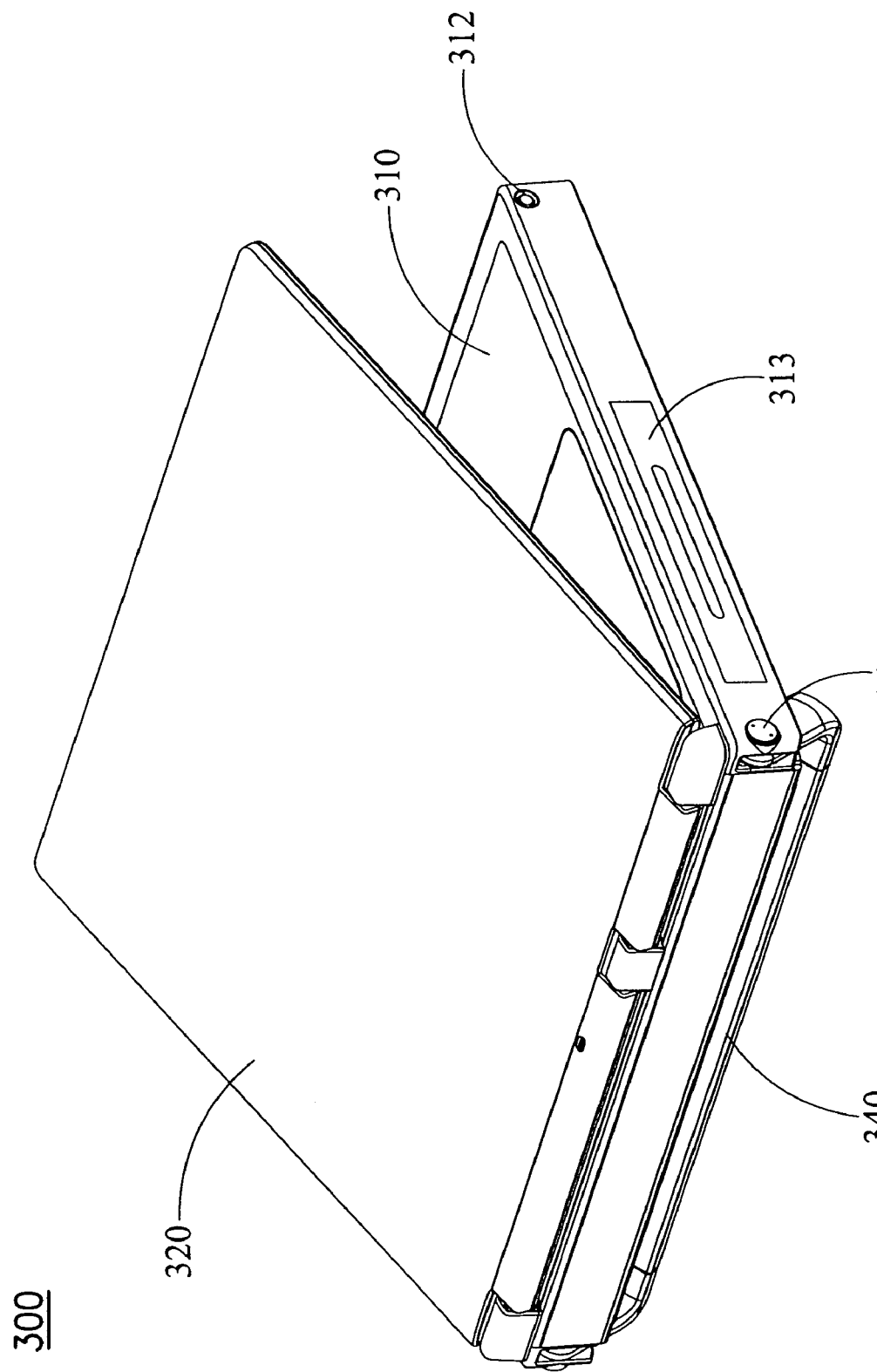
FIG. 5B is a back view of the notebook computer with a handle protruding downward.

Moreover, the notebook computer also has a handle, by which the notebook computer can be easily carried and adjust the inclined angle thereof. In FIG. 5A, the handle 340 is pivoted to the main body 310 near the LCD 320 by pins 341. The handle 340 can rotate within a predetermined range, or within a first angle and a second angle. In FIG. 5B, when the handle 340 is fixed at the first angle, the handle 340 protrudes downward from the main body 310. The inclined angle of the notebook computer 300 is changed. Thus, users may feel more comfortable when using this notebook computer.

Accordingly, the notebook computer of the invention has a hidden multimedia controller. When the multimedia controller is not used, it can be received in the cavity, such that the notebook computer has a better profile. When the switch is pressed, the multimedia controller is pushed out from the cavity with a large operating angle, such that the multimedia controller can be easily used.

While the invention has been described by way of example and in terms of the above embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A notebook computer, comprising:
   a main body with a cavity and a multimedia device;
   a multimedia controller, having at least one key to control the multimedia device, having a display module, and connected to the main body, movable between a first position and a second position, wherein the multimedia controller is received in the cavity when the multimedia controller is in the first position, and the multimedia controller appears when the multimedia controller is in the second position.

2. The notebook computer as claimed in claim 1, wherein the multimedia controller is pivoted to a side surface of the notebook computer.

3. The notebook computer as claimed in claim 1, wherein the main body has a switch, and when the switch is pressed, the multimedia controller is moved from the first position to the second position.

4. The notebook computer as claimed in claim 3, wherein the multimedia controller has a second magnet, the switch includes a rod portion with a first magnet at a tip thereof, by which the multimedia controller is attracted, remaining in the first position in the cavity when the switch is not pressed.

5. The notebook computer as claimed in claim 4, wherein the rod portion is shifted by a predetermined distance when the switch is pressed, and the multimedia controller is pushed out by a repulsive magnetic force between the first magnet and the second magnet.

6. The notebook computer as claimed in claim 1, wherein the display module is an LCD.

7. The notebook computer as claimed in claim 1, further comprising a monitor pivoted to the main body and a handle connected to the main body at the side closed to the monitor.

8. The notebook computer as claimed in claim 7, wherein the handle is pivoted to the main body and movable between a first angle and a second angle.

9. The notebook computer as claimed in claim 8, wherein when the handle is fixed at the first angle, the handle protrudes downward from the main body, changing an inclined angle thereof.

10. The notebook computer as claimed in claim 1, wherein the multimedia device is a disc driver.

11. A notebook computer, comprising:
   a main body having a multimedia device;
   a monitor, pivoted to the main body;
   a multimedia controller, having at least one key to control the multimedia device, having a display module and connected to the main body at an opposite side of the monitor, movable between a first position and a second position.

12. The notebook computer as claimed in claim 11, wherein the main body has a cavity at the opposite side of the monitor, the multimedia controller is received in the cavity when the multimedia controller is in the first position, and the multimedia controller appears when the multimedia controller is in the second position.

13. The notebook computer as claimed in claim 11, wherein the multimedia controller is pivoted to a side surface of the main body.

14. The notebook computer as claimed in claim 11, wherein the main body has a switch, and when the switch is pressed, the multimedia controller is moved from the first position to the second position.

15. The notebook computer as claimed in claim 14, wherein the multimedia controller has a second magnet, the switch includes a rod portion with a first magnet at a tip thereof, by which the multimedia controller is attracted, remaining in the first position in the cavity when the switch is not pressed.

16. The notebook computer as claimed in claim 15, wherein the rod portion is shifted by a predetermined distance when the switch is pressed, and the multimedia controller is pushed out by a repulsive magnetic force between the first magnet and the second magnet.

17. The notebook computer as claimed in claim 11, wherein the display module is an LCD.

18. The notebook computer as claimed in claim 11, further comprising a handle connected to the main body at the side closed to the monitor.

19. The notebook computer as claimed in claim 18, wherein the handle is pivoted to the main body and movable between a first angle and a second angle.

20. The notebook computer as claimed in claim 19, wherein when the handle is fixed at the first angle, the handle protrudes downward from the main body, changing an inclined angle thereof.

21. The notebook computer as claimed in claim 11, wherein the multimedia device is a disc driver.

* * * * *